(12) United States Patent
Kang et al.

(10) Patent No.: US 12,223,499 B2
(45) Date of Patent: Feb. 11, 2025

(54) SYSTEMS AND METHODS FOR EXCHANGING ELECTRONIC TOKENS

(71) Applicant: Touch Point Worldwide, Inc., Costa Mesa, CA (US)

(72) Inventors: Daniel Kang, Costa Mesa, CA (US); Thomas Chen, Costa Mesa, CA (US); Jonathan Ko, Costa Mesa, CA (US)

(73) Assignee: Touch Point Worldwide, Inc., Costa Mesa, CA (US)

( * ) Notice: Subject to any disclaimer, the term of this patent is extended or adjusted under 35 U.S.C. 154(b) by 0 days.

(21) Appl. No.: 18/335,769

(22) Filed: Jun. 15, 2023

(65) Prior Publication Data
US 2024/0135365 A1 Apr. 25, 2024
US 2024/0232865 A9 Jul. 11, 2024

Related U.S. Application Data

(63) Continuation of application No. 18/048,357, filed on Oct. 20, 2022, now Pat. No. 11,734,677.

(51) Int. Cl.
*G06Q 20/38* (2012.01)
*G06Q 20/10* (2012.01)
(Continued)

(52) U.S. Cl.
CPC ........... *G06Q 20/381* (2013.01); *G06Q 20/10* (2013.01); *G06Q 20/367* (2013.01);
(Continued)

(58) Field of Classification Search
CPC .... G06Q 20/381; G06Q 20/10; G06Q 20/367; G06Q 20/389; G06Q 30/0215;
(Continued)

(56) References Cited

U.S. PATENT DOCUMENTS

| 11,734,677 B1* | 8/2023 | Kang | G06Q 20/389 |
| | | | 705/65 |
| 2016/0171479 A1* | 6/2016 | Prakash | G06Q 20/308 |
| | | | 726/1 |

(Continued)

FOREIGN PATENT DOCUMENTS

| AU | 2022396273 A1 * | 5/2024 | ........... G06F 16/217 |
| WO | WO-2017184121 A1 * | 10/2017 | ............ G06Q 20/08 |
| WO | WO-2020077613 A1 * | 4/2020 | |

OTHER PUBLICATIONS

Morsidi et al.; "Blockchain-Based Reward System: a Means for Providing Incentive to Students for Teaching Feedback"; 2021 International Conference on Electronics, Communications and Information Technology (ICECIT), Sep. 4-16, 2021, Khulna, Bangladesh, 5 pages.

(Continued)

*Primary Examiner* — John W Hayes
*Assistant Examiner* — Edgar R. Martinez-Hernandez
(74) *Attorney, Agent, or Firm* — Haynes and Boone, LLP

(57) ABSTRACT

Methods and systems are presented for providing a token exchange framework that enables exchanges of reward tokens corresponding to different reward systems and/or different merchants. The token exchange framework includes a blockchain for storing transaction data associated with transactions of reward tokens. During the onboarding process, reward systems associated with different merchants may be connected to the blockchain of the token exchange framework via one or more bridges. Reward tokens may be issued to represent reward data corresponding to the different reward systems, and can be freely exchanged within the (Continued)

token exchange framework via the blockchain. When a transaction for redeeming a reward is received, reward tokens in the blockchain can be converted into reward data corresponding to the merchant's reward system and process the transaction with the merchant using the converted reward data.

20 Claims, 7 Drawing Sheets

(51) Int. Cl.
*G06Q 20/36* (2012.01)
*G06Q 30/0207* (2023.01)

(52) U.S. Cl.
CPC ....... *G06Q 20/389* (2013.01); *G06Q 30/0215* (2013.01); *G06Q 2220/00* (2013.01)

(58) Field of Classification Search
CPC .. G06Q 2220/00; G06Q 30/06; G06Q 20/387; G06Q 30/0227; G06Q 30/0233
See application file for complete search history.

(56) References Cited

U.S. PATENT DOCUMENTS

| | | | |
|---|---|---|---|
| 2017/0337549 A1* | 11/2017 | Wong | G06Q 20/3821 |
| 2018/0315072 A1* | 11/2018 | Rubin | G06Q 30/0232 |
| 2019/0354967 A1* | 11/2019 | Lee | G06Q 20/382 |
| 2019/0356489 A1* | 11/2019 | Palanisamy | H04L 63/0823 |
| 2019/0385130 A1* | 12/2019 | Mossoba | G06Q 20/10 |
| 2020/0134592 A1* | 4/2020 | Rao | G06Q 20/38215 |
| 2020/0219093 A1* | 7/2020 | Malhotra | G06Q 20/389 |
| 2022/0253836 A1* | 8/2022 | Russell | G06Q 20/389 |
| 2022/0309541 A1* | 9/2022 | Blaikie, III | G06Q 30/0269 |
| 2022/0351232 A1* | 11/2022 | Chan | G06Q 30/0215 |
| 2023/0012276 A1* | 1/2023 | Eisenberg | G06Q 20/02 |
| 2023/0297345 A1* | 9/2023 | Khalfan | G06F 21/64 717/107 |
| 2024/0135365 A1* | 4/2024 | Kang | G06Q 30/0227 |

OTHER PUBLICATIONS

Zheng et al.; "Blockchain-Based secure digital asset exchange scheme with QoS-aware incentive mechanism"; 2019 IEEE 20th International Conference on High Performance Switching and routing (HPSR); 6 pages.

* cited by examiner

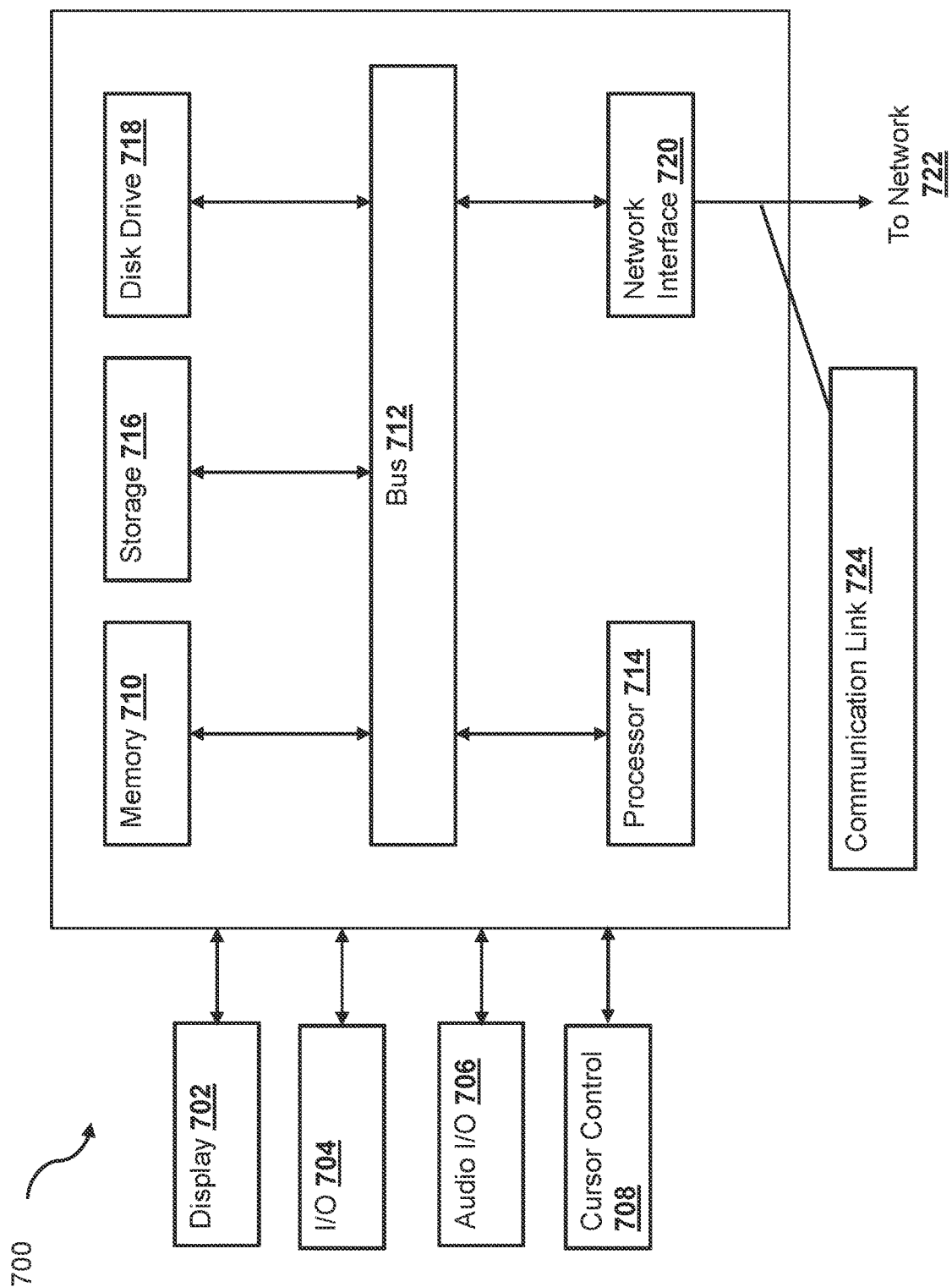

SYSTEMS AND METHODS FOR EXCHANGING ELECTRONIC TOKENS

CROSS REFERENCE TO RELATED APPLICATION

The present invention is a Continuation of U.S. patent application Ser. No. 18/048,357, filed Oct. 20, 2022, which is incorporated herein by reference in its entirety.

TECHNICAL FIELD

The present specification generally relates to providing a blockchain-based platform that enables exchanges of various tokens associated with different entities.

BACKGROUND

It is a common practice for merchants to provide reward programs for consumers to incentivize them to make purchases at their stores. While different reward programs may come in different forms, each reward program typically provides consumers with a certain redeemable item (e.g., a free gift, a discount, an in-store credit, a cashback, etc.) based on a specific amount of spending at the corresponding merchant. For example, each merchant may track spending of its consumers at their store using a quantifiable metric such as a number of stamps, a number of points, etc. When the metric reaches a threshold (e.g., 10 stamps, 100 points, etc.), indicating that the consumer reaches a threshold spending amount, a consumer may be eligible to redeem a reward from the merchant. As such, the metrics that are used by different merchants to track different consumers' spending may have intrinsic values, as they can be used to redeem something of value.

However, many rewards have associated restrictions, which reduce their potential values to the consumers. For example, certain rewards only allow a consumer to redeem a specific item at a store of the merchant, certain rewards only allow a consumer to redeem through a specific merchant, or only allow the consumer to use at one or more specific merchants.

Moreover, due to the lack of interoperability among the infrastructures used by different reward systems, the rewards are generally not exchangeable among the different merchants. For example, one merchant may use a particular stamp card system for recording the spending metrics of consumers, another merchant may store each consumer's spending metric on the consumer's mobile device (e.g., via a proprietary mobile application, etc.), yet another merchant may use a particular electronic database system for recording the spending metrics. The lack of interoperability among the different reward systems further prevents consumers to use the rewards, resulting in inefficiency of the rewards systems. For example, a consumer who is eligible to redeem a reward at a first merchant may no longer patronize that first merchant because the consumer has moved to another city. It would be valuable for the consumer to be able to exchange the reward associated with the first merchant with another reward associated with a second merchant that the consumer would patronize. In another example, a consumer may have collected a number of stamps/points through purchases with a first merchant, but the number of stamps/points is insufficient to redeem a reward from the first merchant. It would be valuable for the consumer to combine the collected number of stamps/points associated with the first merchant with other collected stamps/points associated with a second merchant to become eligible in redeeming a reward. Thus, there is a need to provide a computer framework for facilitating exchanges of different reward tokens associated with different merchants.

BRIEF DESCRIPTION OF THE FIGURES

FIG. 7 is a block diagram of a system for implementing a device according to an embodiment of the present disclosure.

DETAILED DESCRIPTION

Figure 1:
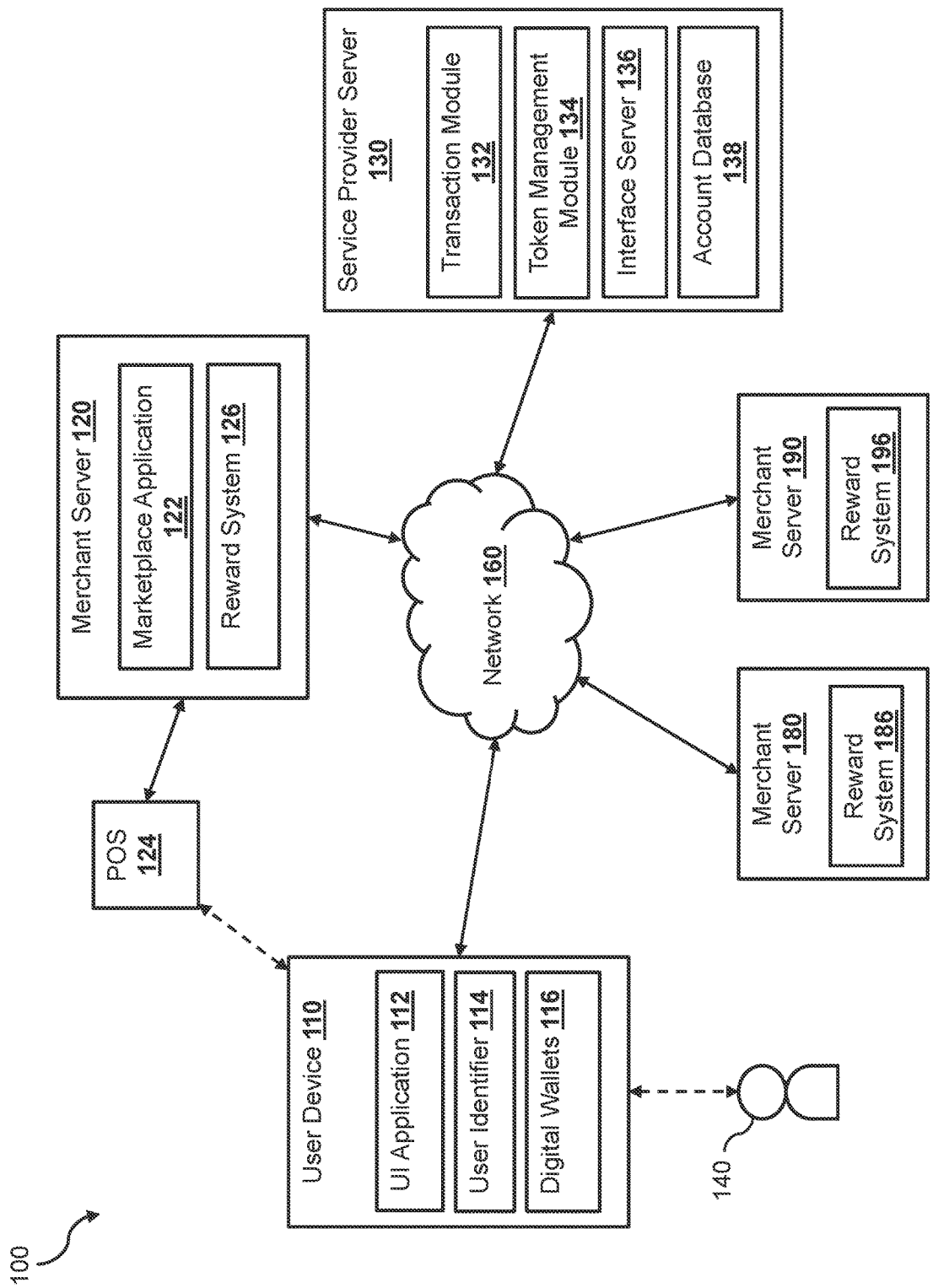
FIG. 1 is a block diagram illustrating a networked system that implements a token exchange framework according to an embodiment of the present disclosure.

The present disclosure includes methods and systems for providing a token exchange framework for facilitating exchanges and transactions of reward tokens associated with different merchants. As discussed herein, different merchants may use different infrastructures for managing the respective rewards system. The infrastructures may be computer-based or non-computer-based. For example, some merchants may use physical stamp cards for tracking consumers' reward data (e.g., numbers of stamps, etc.), some other merchants may use proprietary mobile applications installed on consumers' devices to track the consumers' reward data (e.g., numbers of points, etc.), some other merchants may use a centralized computer database to track the consumers' reward data (e.g., number of points, etc.), yet some other merchants may use decentralized ledgers (e.g., blockchains) to track consumers' reward data (e.g., amounts of tokens, etc.). Typically, merchants may track the reward data associated with different users (e.g., different user accounts), and may enable the users to redeem certain rewards based on the reward data (e.g., when the reward data reaches one or more thresholds, etc.). For example, a coffee shop may issue a stamp on a stamp card every time a consumer purchases a coffee from the shop, and may enable the consumer to redeem a free coffee with a collection of ten stamps. Another merchant may issue points to a reward application of a consumer's device for making a purchase based on an amount of the purchase, and may enable the consumer to redeem in-store credits (e.g., $30 credits for purchases at the merchant store) with a collection of 10,000 points. A financial institution may issue tokens associated with a user account on a blockchain when a consumer performs a transaction using a financial instrument (e.g., a credit card) associated with the financial institution, and may enable the consumer to redeem cash based on the amount of tokens associated with the user account on the blockchain.

Conventionally, due to the limits of these reward infrastructures, reward data associated with different merchants is incompatible with each other. That is, reward data from different reward systems cannot be exchanged, combined, or transacted in a manner outside of the corresponding infrastructures. The lack of interoperability among the various reward systems creates inefficiencies in the reward systems, as rewards collected by consumers are not efficiently dispensed. For example, a consumer cannot exchange stamps associated with the coffee shop with tokens associated with the financial institution, such that the consumer can redeem a desirable item from the financial institution. The consumer also cannot combine the stamps with the tokens, and use them together in a transaction with the coffee shop or the financial institution.

As such, according to various embodiments of the disclosure, the token exchange framework may be configured to use a blockchain-based system to facilitate tracking, exchanging, and transacting reward tokens corresponding to different merchants and/or different reward systems. The token exchange framework may include a blockchain for storing and managing transactions among different types of reward tokens. Reward tokens may be issued (e.g., mined) for use within the token exchange framework. In order to enable the reward tokens to be exchangeable (e.g., transactable) within the token exchange framework using the blockchain, all of the reward tokens may be issued according to the same standard (e.g., the ERC-20 standard). Each token may be designated with a corresponding merchant identifier such that a transaction system within the token exchange framework can differentiate the tokens corresponding to the different merchants, and facilitate the exchange and transactions accordingly. For example, each token may be attached with metadata that identifies the corresponding merchant and/or reward system. In some embodiments, each token is wrapped with the metadata for identifying the corresponding merchant and/or reward system. Thus, a first token may be issued for a first reward system (e.g., a first merchant), and a second token may be issued for a second reward system (e.g., a second merchant). Since the different tokens corresponding to the different merchants and/or different reward systems co-exist in the same blockchain following the same token standard, the different tokens can be freely exchangeable and transactable within the token exchange framework.

In some embodiments, in addition to issuing tokens that correspond to different merchants, the transaction system may also issue universal tokens that do not correspond to any merchant. In some embodiments, the universal tokens may act as an intermediary during exchanges of reward tokens (and reward data associated with various reward systems). In some embodiments, the universal tokens may be used as yet another type of reward metric that can be used to redeem different items.

As discussed herein, many merchants may have already established their own infrastructure for managing their own reward data (e.g., a proprietary stamp card system, a proprietary mobile application, an electronic database system, another blockchain, etc.), and migration from the proprietary reward infrastructure to the token exchange framework can be technically challenging. As such, the transaction system of some embodiments may facilitate conversions between the reward data associated with different proprietary reward infrastructure and the reward tokens within the token exchange framework. In some embodiments, the token exchange framework may include and/or construct one or more bridges for connecting the blockchain with the different existing infrastructure to facilitate the conversions.

For example, as part of the process of onboarding a merchant into the token exchange framework, the transaction system may first determine the type of infrastructure currently used by the merchant to track and manage reward data. When the infrastructure used by the merchant is a blockchain, the transaction system may determine whether the blockchain and/or the tokens stored in the blockchain are generated according to the same standard as the one used by the blockchain in the token exchange framework. If the blockchain used by the merchant is compatible with the blockchain used in the token exchange framework (e.g., both were generated according to the same standard), the transaction system may create a direct bridge between the two blockchains, such that the reward tokens associated with the merchant can freely move between the two blockchains.

If the blockchain used by the merchant is in a different standard than the blockchain used in the token exchange framework, the transaction system may create a multi-chain bridge between the two blockchains. The multi-chain bridge is more complex than the direct bridge created for the first onboarding scenario, in that the multi-chain bridge includes additional processing for the tokens when the tokens are transferred between the two blockchain systems. For example, since the tokens from the blockchain associated with the merchant cannot be transacted within the token exchange framework, the transaction system may first create an account (e.g., a digital wallet, etc.) with the merchant. When a token from the blockchain associated with the merchant is transferred to the token exchange framework, the transaction system may acquire the token through the account. The transaction system may also generate a wrapped token within the token exchange framework for that transferred token. The wrapped token is separate from the transferred token, and is linked to the transferred token via an IOU contract (a smart contract within the blockchain system), such that one can always obtain the transferred token to be used in the merchant's reward system (e.g., the blockchain associated with the merchant) based on the wrapped token. The implementation of the IOU smart contract enables trust between the blockchain of the token exchange framework and the blockchain of the merchant.

When the infrastructure used by the merchant is a computer-based database system other than a blockchain (e.g., a database system, etc.), the transaction system may create an external bridge between the token exchange framework and a reward management server associated with the merchant via one or more application programming interfaces (APIs) associated with the reward management server. Through the external bridge, the transaction system may communicate with the reward management server of the merchant. For example, the transaction system may register for an account with the reward management server, and may conduct transactions with the merchant, on behalf of the users, through the account and via the external bridge.

Similar to the second scenario, the transaction system may generate wrapped tokens to represent the reward data (e.g., points) managed by the reward management server. For example, the transaction system may generate a wrapped token for each predetermined unit (e.g., one point, ten points, a hundred points, etc.) of the reward data associated with the reward management system. When reward data associated with the reward management system is being transferred into the token exchange framework, the transaction system may acquire the reward data through the account created with the reward management system. The transaction system may also generate one or more wrapped tokens within the token exchange framework for that transferred reward data. The wrapped tokens are linked to the transferred reward data, such that the transaction system may retrieve the reward data to be used in a transaction with the merchant's reward management server on behalf of the user based on the wrapped tokens.

Instead of maintaining and managing rewards associated with the merchant in two separate infrastructures, in some embodiments, the merchant may abandon the existing computer-based infrastructure in favor of the token exchange framework, such that the reward data of the merchant is only represented as wrapped tokens within the token exchange framework. Consumers of the merchant would have accounts with the transaction system and would receive wrapped tokens corresponding to the merchant from the token exchange framework based on transactions with the merchant according to reward guidelines specified by the merchant.

When the infrastructure used by the merchant is a non-computer-based system (e.g., a stamp card system, etc.), the transaction system may simply require the merchant to convert from the non-computer-based system to the token exchange framework. Initially, the merchant may ask its consumers to create accounts with the token exchange framework (if they do not have an account with the framework already), and may convert existing reward data collected by each consumer to a corresponding amount of wrapped tokens within the token exchange framework via the account of the consumer. Subsequent to the initial conversion, consumers of the merchant may directly obtain wrapped tokens within the token exchange framework based on transactions with the merchant according to reward guidelines specified by the merchant.

Once the reward data associated with various merchants and/or reward systems is represented by reward tokens within the token exchange framework, the transaction system may facilitate exchanges and transactions of reward tokens for the users. For example, a first user, via a first user account with the token exchange framework, may request to exchange reward tokens associated with the first user account and corresponding to a first merchant (e.g., a coffee shop) with reward tokens corresponding to a second merchant (e.g., an airline). If the transaction system, via an account of the transaction system, possesses the reward tokens corresponding to the second merchant, the transaction system may perform the exchange directly with the first user. On the other hand, if the transaction system does not possess the reward tokens corresponding to the second merchant (or possesses insufficient reward tokens for the exchange), the transaction system may identify one or more other users who have the reward tokens corresponding to the second merchant and desire to exchange for reward tokens corresponding to the first merchant.

In some embodiments, when the exchange is conducted between a first user account of the first user and a second user account of a second user, instead of between the first user account of the first user and the account of the transaction system, the transaction system may first exchange the reward tokens corresponding to the first merchant for a corresponding amount of universal tokens for the first user account, and exchange the reward tokens corresponding to the second merchant for the corresponding amount of universal tokens for the second user account. The transaction system may then reverse the transaction using the opposite reward tokens, such that the first user account may obtain the reward tokens corresponding to the second merchant using the universal tokens, and the second user account may obtain the reward tokens corresponding to the first merchant using the universal tokens.

In some embodiments, the users may, through the transaction system, convert their reward tokens corresponding to one or more merchants to the universal tokens, such that they can use the universal tokens to "buy" other reward tokens as they wish. In a sense, the universal tokens may act as an intermediary (e.g., a currency) for users to barter reward tokens with. In some embodiments, the users may hold the universal tokens until the time of transaction (e.g., a transaction that uses one or more reward tokens corresponding to a particular merchant). At the time of transaction, the transaction system may perform the transaction for the user with the particular merchant by automatically converting the universal tokens to the reward tokens/reward data used by the merchant for the transaction.

In some embodiments, the transaction system may establish exchange rates for exchanging between reward tokens corresponding to different merchants/reward systems. The exchange rates between reward tokens corresponding to two different merchants may be determined based on supply/demand for each of the reward tokens, the intrinsic values of the reward tokens (e.g., the value of the redeemable items associated with the reward tokens), and/or other metrics. By operating the token exchange framework using a blockchain, other third-party exchange platforms can establish their own exchange rates and perform exchanges of different reward tokens for the users by recording the exchange transactions on the blockchain of the token exchange framework.

In addition to facilitating exchanges of reward tokens, the transaction system may also facilitate redeeming items using the reward tokens for users. Specifically, the transaction system may use a connection established with the point-of-sale (POS) systems of different merchants to facilitate the purchase transactions and redeeming of rewards with the merchants based on communicating with the POS systems. Thus, as a user (or a merchant) initiates a purchase transaction via the point-of-sale device of the merchant, the transaction data may be obtained by the transaction system of the token exchange framework via the connection. In some embodiments, the transaction may include redeeming an item using rewards associated with the merchant. Based on the transaction data, the transaction system may determine an identity of the user (and a user account of the user), an identity of the merchant (or the reward system) associated with the transaction and an amount of reward tokens required to process the transaction.

The transaction system may then access the user account to determine data associated with the reward tokens in possession by the user account. For example, the transaction system may determine whether the user account is in possession of any reward tokens corresponding to the merchant (and/or the reward system), and whether the reward tokens corresponding to the merchant is sufficient for processing the transaction. If the user is not in possession of any reward tokens corresponding to the merchant or the reward tokens possessed by the user is insufficient for the transaction, the transaction system may determine whether the user is in possession of reward tokens corresponding to other merchants. If the user is in possession of reward tokens corresponding to other merchants, the transaction system may facilitate exchange of the tokens corresponding to the other merchants for reward tokens corresponding to the merchant involved in the transaction, such that the reward tokens can be converted to the ones that can be used to redeem the item in the transaction.

Once the transaction system determines that the user, through the user account, has sufficient reward tokens corresponding to the merchant to for processing the transaction (e.g., based on the conversion), the transaction system may use those reward tokens to process the transaction. Since different merchants may use different infrastructure for managing the rewards (e.g., some merchants may be completely opted-in to the token exchange framework, some merchants may use a blockchain, some merchants may use a computer-based data storage, etc.), the transaction system may perform different processes for processing transactions (e.g., redeeming rewards) with different merchants, depending on their native reward infrastructure.

For example, when the native reward infrastructure of the merchant is a blockchain that is compatible with the token exchange framework, the transaction system may simply transfer the reward tokens corresponding to the merchant from the blockchain of the token exchange framework to the blockchain of the merchant, and record a transaction on the blockchain of the merchant for using the transferred reward tokens to redeem the item.

When the native reward infrastructure of the merchant is a blockchain that is incompatible with the token exchange framework, the transaction system may access the wrapped reward tokens that reside within the token exchange framework and corresponding to the merchant. As discussed herein, each the wrapped reward tokens are associated (e.g., wrapped) with metadata that links to a corresponding token within the merchant's blockchain ecosystem. The wrap (e.g., metadata) associated with a wrapped reward token may also include an IOU smart contract for converting the wrapped reward token to a corresponding token within the merchant's blockchain ecosystem. Thus, by executing the IOU smart contract, the transaction system may convert the wrapped reward tokens to tokens in the merchant's blockchain. The transaction system may then use the converted tokens to process the transaction with the merchant (e.g., by recording a redeem transaction on the merchant's blockchain).

When the native reward infrastructure of the merchant is a computer-based data storage system (other than blockchains), the transaction system may first convert the reward tokens to the corresponding reward data (e.g., a corresponding amount of points, a corresponding number of stamps, etc.) associated with the merchant's reward management server. The reward data may be in control by an account of the transaction system with the merchant's reward management server. Thus, the transaction system may, via the account, use the reward data to process the transaction (e.g., redeem the item) on behalf of the user to complete the transaction.

As illustrated herein, by using the token exchange framework, one can efficiently make use of the rewards that may be associated with different merchants (or different reward systems) by dynamically exchanging one type of reward tokens to another type of reward tokens, combining different types of reward tokens, and using reward tokens corresponding to a first merchant for redeeming items at a second merchant easily. Below are several use cases that further illustrates different embodiments of the disclosure.

Use Case 1

Jane arrives at a coffee shop that she has never been while she was visiting a city. Since Jane has never made purchases at that coffee shop before, she does not have any reward points corresponding to the coffee shop. The coffee shop uses a proprietary computer system, that includes a sever and mobile applications installable on user devices, to facilitate management and transactions of the reward points.

In response to detecting that Jane is at the coffee shop (through a location component of a user device of Jane), the transaction system accesses a user account of Jane. The transaction system may determine that Jane has reward tokens corresponding to another merchant, if exchanged to the reward points corresponding to the coffee shop, would enable Jane to redeem a free coffee. As such, the transaction system may transmit a notification (e.g., via a mobile application associated with the transaction system, sending a SMS message, etc.) to the user device of Jane, indicating that Jane may be eligible for a free cup of coffee at the coffee shop. In some embodiments, the transaction system may present, on the user device of Jane, the reward tokens (corresponding to the other merchant) required for the redemption of the free coffee. If there are more than one way to obtain the sufficient reward points for the free coffee (e.g., using different reward tokens or different combinations of reward tokens corresponding to different merchants, etc.), the transaction system may present the options on the user device. Jane may be able to select a conversion option to obtain the free coffee via interacting with the user device. Upon receiving a selection from Jane via the user device, the transaction system may perform the necessary conversions (exchanges) to obtain the reward points corresponding to the coffee shop, and use the reward points in a transaction with the coffee shop using techniques described here to redeem a free cup of coffee for Jane.

Use Case 2

A pizza shop is offering deal that enables users to redeem a free large pizza using 10 reward tokens corresponding to the pizza shop. The transaction system may detect that John is browsing a website of the pizza shop, in the process of ordering food from the pizza shop. The transaction system may determine that John does not have sufficient reward tokens for redeeming the free large pizza (e.g., John may only have six reward tokens). However, the transaction system may determine that Sue (who is connected with John within the token exchange system or with a social media platform) has five reward tokens. Thus, the combination of their reward tokens is sufficient to redeem the free large pizza. The transaction system may then transmit a notification to a user device of John and a user device of Sue, notifying them of the possible transaction that enables them to share the free large pizza. The notification may allow each of them to confirm to participate in the transaction. If both John and Sue confirms (via the user devices), the transaction system may combine the reward tokens (e.g., transferring the reward tokens from John's account and Sue's account to an account of the transaction system), and may process the redeeming transaction for the free large pizza with the pizza shop. This way, John and Sue may share the free large pizza due to the features and functionalities of the transaction system.

Use Case 3

In some embodiments, the token exchange framework as disclosed herein enables reward brokers to broker deals related to rewards associated with different merchants. The deals may include lending and borrowing of reward data for different users. For example, a user may be shopping for an airline ticket for a trip. The airline offers a reward (e.g., a free ticket, an upgrade to a higher level ticket, etc.) in exchange for 10 reward tokens corresponding to the airline. The user only has 9 reward tokens corresponding to the airline at the time being, 1 reward token short for obtaining the reward. Conventionally, the user may be out of luck, and may have to wait for the next trip when he has sufficient reward tokens in order to be able to take advantage of the reward. However, using the features of the token exchange framework, a reward broker module (which can be part of the token exchange framework or operated by a third party) may provide advancement of tokens to users such that the user can take advantage of the available rewards at the time, and return the borrowed reward tokens (and in some embodiments, along with additional reward tokens as interest) to the reward broker module. Thus, the reward broker module may transfer 1 token to the user, such that the user may use the 9 reward tokens in the user's account, along with the borrowed 1 reward token to collect the reward from the airline. The transaction system may perform the transaction to exchange the 10 reward tokens for the reward (e.g., free airline ticket, free upgrade, etc.) with an airline server of the airline.

In some embodiments, the transaction of borrowing the 1 reward token may be recorded (e.g., by the transaction system or the reward broker module) as a smart contract in the blockchain of the token exchange framework, such that whenever the user earns tokens (either corresponding to the airline or corresponding to other merchants), the points may be automatically transferred to the reward broker module until the borrowed tokens (plus interest) is paid off. As such, after the user obtained the reward from the airline, the user may continue to earn additional tokens with the airline or other merchants. As the user earns the additional tokens, the tokens may be automatically transferred to an account associated with the reward broker module based on the execution of the smart contract.

Use Case 4

As discussed herein, the token exchange framework enables exchanges of reward tokens, even among different users. In some embodiments, the transaction system may provide an exchange platform (e.g., a barter website or mobile application) for users to exchange reward tokens corresponding to different merchants. In some embodiments, the exchange may also involve a currency (e.g., U.S. Dollars, British Pounds, Euros, Bitcoin, Ethereum, etc.) such that users may buy and/or sell their reward tokens. Thus, the user in Use Case 3 may also have the option to purchase the additional 1 reward token from the transaction system, the reward broker module, and/or any other users to be eligible for the reward.

While most of the examples illustrated here describe exchanges of reward data corresponding to different merchants, it has been contemplated that the token exchange framework as disclosed herein may include gift card currency as well. Since gift card currencies are not equivalent to a real currency as it has restrictions on where (e.g., which merchant, which store, etc.), how (e.g., in-store purchase only, online only), and/or even when (e.g., having associated with an expiration date), the gift card currencies can be converted into reward tokens in the similar manner as points or stamps using the techniques disclosed herein such that the gift card currencies can be exchanged freely without friction within the token exchange framework.

Use Case 5

In some embodiments, the transaction system may enable automatic conversion or automatic awarding of reward tokens based on a relationship between two merchants. For example, the transaction system may detect a relationship between a jewelry store and a coffee shop (e.g., a large percentage of consumers of the jewelry store also patronize the coffee shop regularly). Based on this relationship, the transaction system may create automatic awarding of reward tokens that are cross-merchants. For example, when the transaction system detects that the user has just spent a particular amount at the jewelry store, the transaction system may automatically award reward tokens corresponding to the coffee shop to a user account of the user. In some embodiments, the reward tokens corresponding to the coffee shop that are awarded to the user is in addition to (or in place of) the reward tokens corresponding to the jewelry store that are provided to the user. Using this relationship-based automatic awarding of reward tokens, the coffee shop may encourage users to patronize the coffee shop based on spending activities at other merchants (e.g., the jewelry store).

FIG. 1 illustrates a networked system 100, within which the token exchange framework may be implemented according to one embodiment of the disclosure. Note that the present techniques may be applied in many different computing and technological environments, however, and are not limited to those shown in the figures. The networked system 100 includes a service provider server 130, a user device 110, and merchant servers 120, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130, and the merchant servers 120, 180, and 190 over the network 160. For example, the user 140 may use the user device 110 to interact/communicate with any one of the merchant servers 120, 180, and 190, to perform purchase transaction and/or collect rewards data with the corresponding merchants. The user 140 may also use the user device to interact/communicate with the service provider server 130 to manage reward tokens, exchange reward tokens, and perform transactions using the reward tokens. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 140 to interact with the service provider server 130 and/or any one of the merchant servers 120, 180, and 190 over the network 160. In one implementation, the UI application 112 includes a software program (e.g., a mobile application) that provides a graphical user interface (GUI) for the user 140 to interface and communicate with the service provider server 130/or any one of the merchant servers 120, 180, and 190 via the network 160. In another implementation, the UI application 112 includes a browser module that provides a network interface to browse information available over the network 160. For example, the UI application 112 may be implemented, in part, as a web browser to view information available over the network 160.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

The user device 110, in one embodiment, may also include one or more digital wallets 116, each of the digital wallets 116 may be used by the user 140 to store and manage reward tokens corresponding to different blockchains (e.g., a blockchain associated with the service provider server 120, a blockchain associated with a merchant server, etc.).

In various implementations, the user 140 is able to input data and information into an input component (e.g., a keyboard) of the user device 110. For example, the user 140 may use the input component to interact with the UI application 112 (e.g., to request an exchange of reward tokens, to redeem an item using reward tokens, etc.).

While only one user device 110 is shown in FIG. 1, it has been contemplated that multiple user devices, each associated with a different user, may be connected to the service provider server 130, and the merchant servers 120, 180, and 190 via the network 160.

Each of the merchant servers 120, 180, and 190, in one embodiment, may be maintained by a respective merchant. Example merchants may include a retail store (e.g., a coffee shop, a clothing store, a restaurant, etc.), a service provider (e.g., an airline, a medical service provider, etc.), a financial institution (e.g., a bank, etc.), or other organization that provides goods and/or services to consumers. In some embodiments, a merchant may provide online services (e.g., an e-commerce website, etc.) to its users. For example, the merchant server 120 may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 and the user of the user device 180 may interact with the marketplace application 122 through the user interface application 112 over the network 160 to search and view various items or services available for purchase, obtain reward data (e.g., stamps, points, tokens, etc.) based on the purchases, and redeem the reward data for various items. The merchant server 120 may be associated with a point-of-sale (POS) device 124. The POS device 124 may be located at a store of the merchant, and configured to process purchase transactions for the merchant.

In some embodiments, each of the merchant servers 120, 180, and 190 may include respective reward systems 126, 186, and 196 configured to track, manage, and facilitate transactions based on reward data. As discussed herein, each of the reward systems 126, 186, and 196 may be implemented using a different reward infrastructure, which may be computer-based or non-computer-based. Examples of different reward infrastructures used by the reward systems 126, 186, and 196 will be illustrated in more details below by reference to FIG. 2.

Referring back to FIG. 1, the service provider server 130, in one embodiment, may be maintained by an online service provider as part of the token exchange framework, which may provide reward management services to users (e.g., the user 140) and merchants. The service provider server 130 may include an interface server 136 that is configured to serve content (e.g., web content, account content, etc.) to users and interact with users. For example, the interface server 136 may include a web server configured to serve web content in response to HTTP requests form the UI application 112. In another example, the interface server 136 may include an application server configured to interact with a corresponding application (e.g., the UI application 112) installed on the user device 110 via one or more protocols (e.g., RESTAPI, SOAP, etc.). As such, the interface server 136 may include pre-generated electronic content ready to be served to users.

The service provider server 130, in one embodiment, may be configured to maintain one or more user accounts in an account database 138, each of which may be associated with a profile and may include account information associated with one or more individual users (e.g., the user 140 associated with user device 110, etc.). For example, account information may include private information of users, such as one or more account numbers, passwords, digital wallets information, transaction history, Internet Protocol (IP) addresses, device information associated with the user account.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login or a request, and the user attributes may be utilized by the service provider server 130 to associate the user with one or more particular user accounts maintained by the service provider server 130.

In various embodiments, the service provider server 130 includes a transaction module 132 and a token management module 134 that together implement the transaction system disclosed herein. In some embodiments, the token management module 134 may include a ledger (e.g., a blockchain) for storing reward tokens corresponding to various merchants and transaction data associated transactions associated with the reward tokens (e.g., exchanges of reward tokens, purchases of reward tokens, sales of reward tokens, redeeming of reward tokens, etc.). The token management module 134 may issue (e.g., mine) various reward tokens to be stored and managed in the blockchain. The reward tokens issued by the token management module 134 may correspond to different merchants and/or reward system. In some embodiments, each reward token issued by the token management module 134 may be designated with a corresponding merchant identifier such that the token management module 134 and/or the transaction module 132 can differentiate the tokens corresponding to the different merchants, and facilitate the exchange and transactions accordingly.

For example, each token may be attached with metadata that identifies the corresponding merchant and/or reward system. In some embodiments, each token is wrapped with the metadata for identifying the corresponding merchant and/or reward system. Thus, a first token may be issued for the reward system 126 of the merchant server 120, a second token may be issued for the reward system 186 of the merchant server 180, and a third token may be issued for the reward system 196 of the merchant server 190. In order for the reward tokens that correspond to different merchants and/or different reward systems to be exchangeable (e.g., transactable) within the token exchange framework using the blockchain, all of the reward tokens may be issued by the token management module 134 according to the same standard (e.g., the ERC-20 standard). Since the different tokens corresponding to the different merchants and/or different reward systems co-exist in the same blockchain following the same token standard, the different tokens can be freely exchangeable and transactable within the token exchange framework.

In some embodiments, the transaction module 132 is configured to perform transactions associated with the reward tokens for different users and merchants. For example, the transaction module 132 may perform processes for onboarding various merchants and/or various reward systems 126, 186, and 196 into the token exchange framework, may perform processes for facilitating exchanges of reward tokens corresponding to different merchants for various users, and may perform processes for redeeming rewards using the reward token with merchants for the various users.

Figure 2:
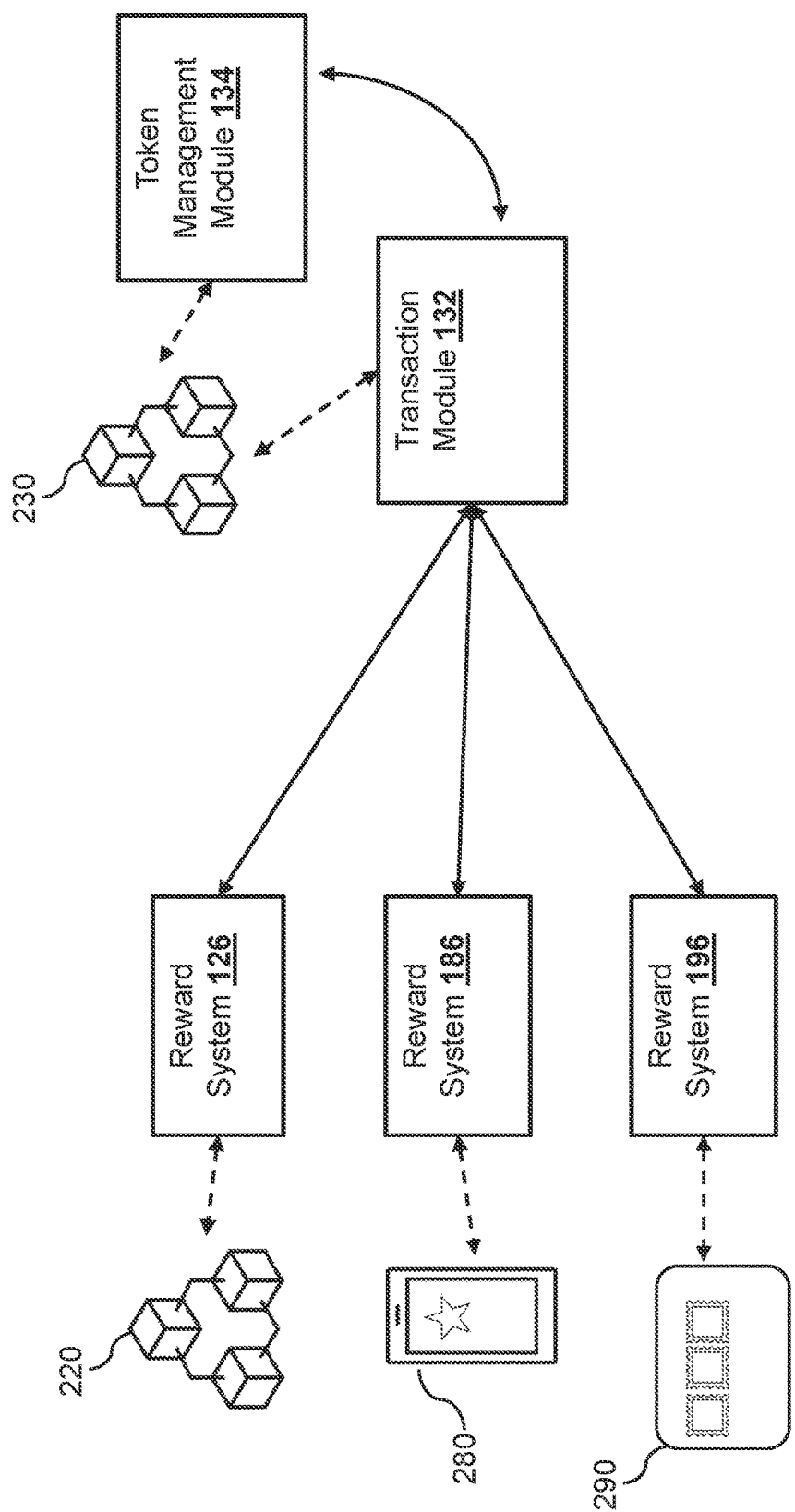
FIG. 2 illustrates onboarding of different reward systems according to an embodiment of the present disclosure.

FIG. 2 illustrates the onboarding processes performed by the transaction system 132 for onboarding merchants associated with different types of reward systems. As discussed herein, the token management module 134 may generate, or may be associated with, a blockchain 230 for storing reward tokens and data associated with various transactions associated with the reward tokens. In some embodiments, the token management module 134 may generate the blockchain 230 and issue (e.g., mine) reward tokens for the blockchain 230 according to a standard (e.g., the ERC-20 standard). The token management module 134 may issue reward tokens that correspond to different merchants (e.g., merchants associated with the merchant servers 120, 180, and 190, etc.) and universal tokens that do not correspond to any merchants. As discussed herein, due to the different infrastructures associated with the different reward systems (e.g., the reward systems 126, 186, and 196), the transaction module 132 may be configured to use different processes for onboarding the different merchants.

In this example, the transaction module 132 may be configured to onboard the merchants associated with the merchant servers 120, 180, and 190, associated with the reward systems 126, 186, and 196, respectively. As shown, each of the reward systems 126, 186, and 196 is implemented in a different reward infrastructure. For example, the reward system 126 uses a blockchain 220 for recording and managing reward data associated with the merchant server 120, the reward system 186 uses a physical stamp card system 280 for recording and managing reward data associated with the merchant server 180, and the reward system 126 uses a computer-based system 290 (non-blockchain) for recording and managing reward data associated with the merchant server 190.

Since the reward system 126 of the merchant server 120 is implemented using the blockchain 220, in order to perform the onboard process for the merchant associated with the merchant server 120, the transaction module 132 may determine whether the blockchain 220 is compatible with the blockchain 230 associated with the service provider server 130. Specifically, the transaction module 132 may determine whether the blockchain 220 and the tokens that reside in the blockchain 220 were generated according to the same standard (e.g., the ERC-20 standard) as the blockchain 230 and its reward tokens. If it is determined that the blockchain 220 is compatible with the blockchain 230 (e.g., both generated using the same standard, etc.), the transaction module 132 may create a direct bridge between the two blockchains 220 and 230. The direct bridge enables tokens associated with the blockchain 220 and the rewards token associated with the blockchain 230 to freely move between the blockchain 220 and the blockchain 230. blockchains.

On the other hand, if it is determined that the blockchain 230 is incompatible with the blockchain 220 (e.g., the blockchain 230 was generated using a different standard than the one used to generate the blockchain 220), the transaction module 132 may create a multi-chain bridge between the two blockchains 220 and 230. The multi-chain bridge is more complex than the direct bridge, in that the multi-chain bridge includes additional processing for the tokens when the tokens are transferred between the two blockchains 220 and 230. For example, since the tokens from the blockchain 220 cannot be transacted within the blockchain 230 (as they were generated using different standards), the transaction module 132 may first create an account (e.g., a digital wallet, etc.) with the merchant associated with the merchant server 120. When a token from the blockchain 220 is transferred to the blockchain 230, the transaction module 132 may acquire the token through the account. The transaction module 132 may also generate a wrapped token within the blockchain 230 for that transferred token. The wrapped token is linked to the transferred token via an IOU contract (a smart contract within the blockchain system), such that one can always obtain the transferred token to be used in the merchant's reward system 126 based on the wrapped token. The implementation of the IOU smart contract enables trust between the two different blockchains 220 and 230 such that the integrity is maintained with the transfer of tokens between the two blockchains 220 and 230.

Unlike the reward system 126, the reward system 186 of the merchant server 180 uses a non-blockchain computerized system 280 to track and manage reward data for the merchant associated with the merchant server 180. The computerized system 280 may store reward data associated with different consumers in a centralized database, or distributed among the user devices of the consumers (e.g., via a mobile application). In order to process the onboarding of the merchant associated with the merchant server 180, the transaction module 132 may create an external bridge between the blockchain 230 and the computerized system 280 via one or more application programming interfaces (APIs) associated with the computerized system 280. Through the external bridge, the transaction module 132 may communicate with the reward system 186 of the merchant. For example, the transaction module 132 may register for an account with the reward system 186, and may conduct transactions with the merchant, on behalf of the users, through the account and via the external bridge.

In some embodiments, the transaction module 132 may generate wrapped tokens to represent the reward data (e.g., points) managed by the reward system 186. For example, the transaction module 132 may generate a wrapped token for each predetermined unit (e.g., one point, ten points, a hundred points, etc.) of the reward data associated with the reward system 186. When reward data associated with the reward system 186 is being transferred into the blockchain 230, the transaction module 132 may acquire the reward data through the account created with the reward system 186. The transaction system may also generate (e.g., mine) one or more wrapped tokens within the blockchain 230 for that transferred reward data. The wrapped tokens are linked to the transferred reward data, such that the transaction module 132 may retrieve the reward data to be used in a transaction with the merchant's reward system 186 on behalf of the user based on the wrapped tokens.

Instead of maintaining and managing rewards associated with the merchant in two separate infrastructures, in some embodiments, the merchant associated with the merchant server 180 may abandon the existing computer-based reward system 186 in favor of the token exchange framework, such that the reward data of the merchant is only represented as wrapped tokens within the blockchain 230. Consumers of the merchant would have accounts with the service provider server 130 and would receive wrapped tokens corresponding to the merchant from the service provider server 130 based on transactions with the merchant according to reward guidelines specified by the merchant.

As shown in FIG. 2, the reward system 196 of the merchant server 190 may use a physical stamp card system 290 to track and manage reward data associated with the merchant. When the infrastructure used by the reward system 196 is a non-computer-based system, the merchant may be required to abandon the reward system 196 and convert to the token exchange framework. Initially, the merchant may ask its consumers to create accounts with the service provider server 130 (if they do not have an account with the service provider server 130 already), and may convert existing reward data collected by each consumer to a corresponding amount of wrapped tokens within the blockchain 230 via the account of the consumer (e.g., the digital wallet 116 of the user 140, etc.). Subsequent to the initial conversion, consumers of the merchant may directly obtain wrapped tokens from the transaction module 132 based on transactions with the merchant according to reward guidelines specified by the merchant.

Figure 3:
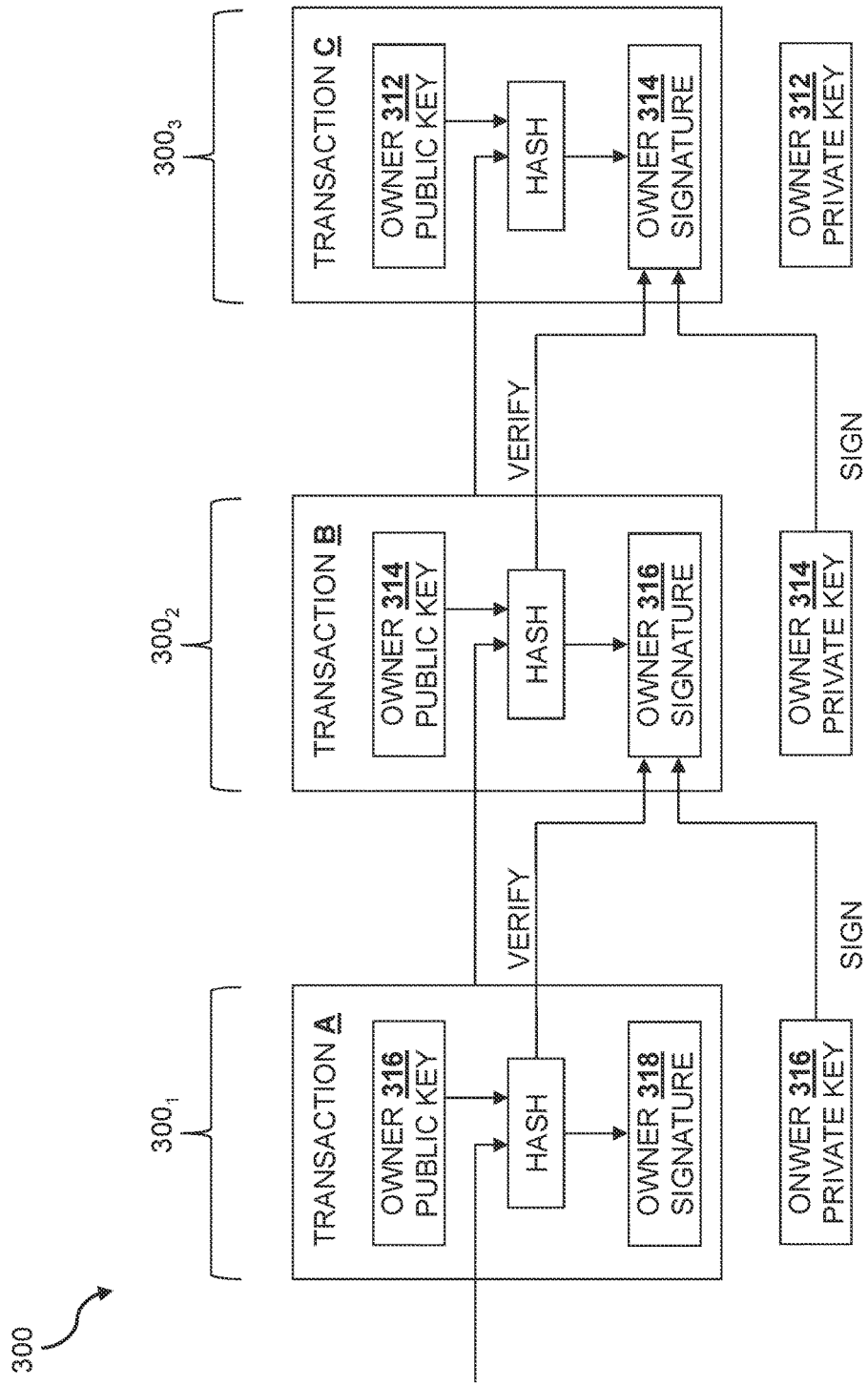
FIG. 3 is a schematic view illustrating an electronic token according to an embodiment of the present disclosure.

Once the reward data associated with various merchants and/or reward systems 126, 186, and 196 is represented by reward tokens within the blockchain 230, the transaction module 132 may facilitate exchanges and transactions of reward tokens for the users by recording transactions in the blockchain 230. FIG. 3 illustrates an example electronic token 300 according to one embodiment of the disclosure. The electronic token (also referred to as a "token" or a "reward token" herein) 300 may correspond to reward data corresponding to a particular merchant. The electronic token 300 is an electronic product that is transferrable among different parties based on a particular protocol. In some embodiments, the electronic token 300 may be defined as a chain of digital signatures provided by previous owners of the electronic token 300 to subsequent owners of the electronic token. In the illustrated embodiment, the electronic token 300 is owned by an owner 312, and FIG. 3 illustrates how the electronic token 300 is defined by the digital signatures of the previous owners 314, 316, and 318. Specifically, in transaction A, a hash of the public key of owner 316 (i.e., the owner receiving, as a result of transaction A, the electronic token $300_1$ defined by digital signatures provided up to transaction A) and the previous transaction (not illustrated, but occurring prior to transaction A) was signed by owner 318 (i.e., the owner providing, as a result of transaction A, the electronic token $300_1$ defined by digital signatures provided up to transaction A) using a private key and added to an initial electronic token (which was defined by digital signatures provided up to the transaction prior to transaction A) such that the electronic token $300_1$ was transferred to owner 316.

Similarly, in transaction B, a hash of the public key of owner 314 (i.e., the owner receiving, as a result of transaction B, an electronic token $300_2$ defined by digital signatures provided up to transaction B) and transaction A was signed by owner 316 using a private key and added to the electronic token $300_2$ such that the electronic token $300_2$ was transferred to owner 314. Similarly, in transaction C, a hash of the public key of owner 312 (i.e., the owner receiving, as a result of transaction C, the electronic token $300_3$ defined by digital signatures provided up to transaction C) and the transaction B was signed by owner 314 using a private key and added to the electronic coin $300_3$ such that the electronic token 300 was transferred to owner 312. As is understood in the art, any payee receiving an electronic token (e.g., owner 316 in transaction A, owner 314 in transaction B, and owner 312 in transaction C) can verify the signatures to verify the chain of ownership of the electronic token 300.

Figure 4:
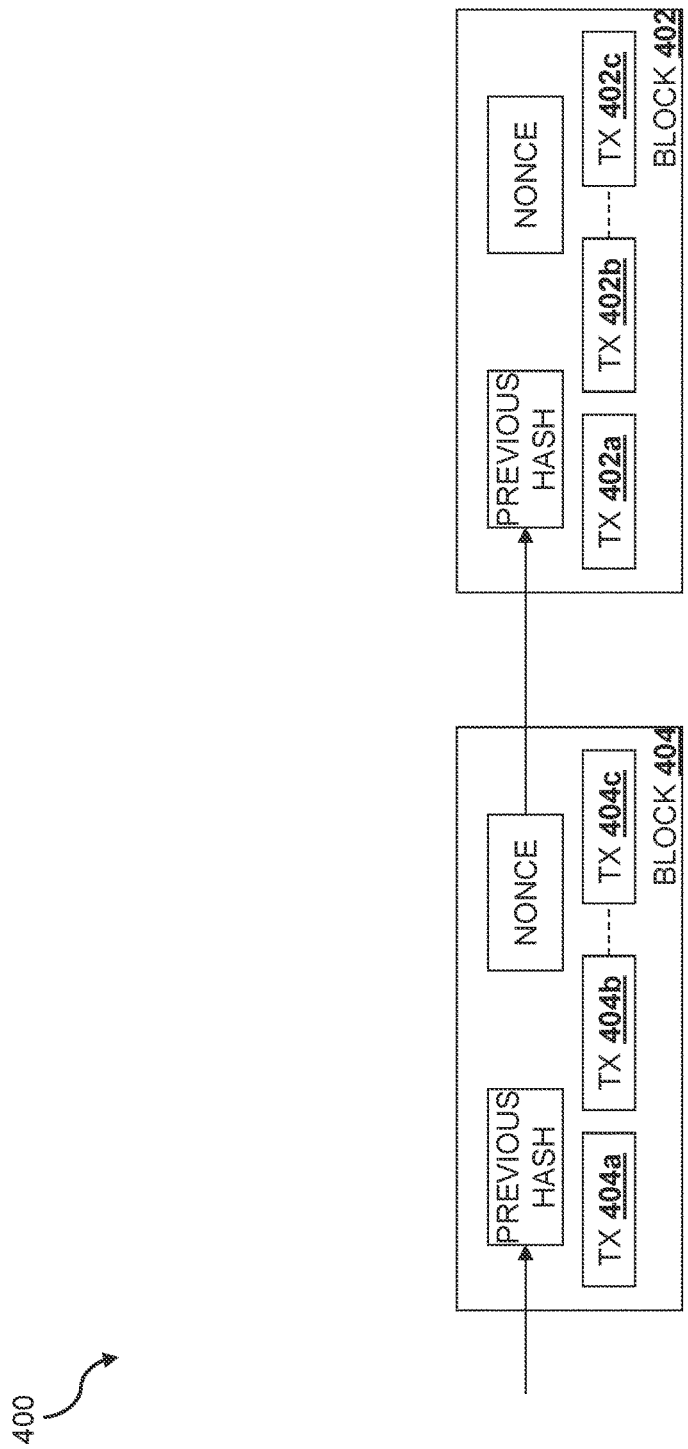
FIG. 4 is a schematic view illustrating a token transaction ledger according to an embodiment of the present disclosure.

In some embodiments, tokens are transferred to a wallet associated with the transaction module 132. The transfer of the tokens to the wallet may be recorded as new transaction blocks in the blockchain 230. FIG. 4 illustrates an example ledger 400 according to one embodiment of the disclosure. The ledger 400 operates to verify previous transactions (e.g., transfer) and ownership of electronic tokens (e.g., referring back to FIG. 3, owner 316 in transaction A, owner 314 in transaction B, and owner 312 in transaction C) such that owners did not "double-spend" (e.g., use a private key to sign any previous transactions involving) that electronic token. To produce the ledger 400, a single device (e.g., the service provider server 130) or a distributed network of devices may operate to agree on a single history of transactions in the order in which they were received such that it may be determined that a transaction between a transferrer and a transferee of a token is the first transaction associated with that electronic token from the transferrer. Each device in the distributed network operates to collect new transactions into a block, and then to increment a proof-of work system that includes determining a value that when hashed with the block provides a required number of zero bits.

For example, for a block 402 that includes a plurality of transactions 402a, 402b, and up to 402c, a device in the distributed network may increment a nonce in the block 402 until a value is found that gives a hash of the block 402 the required number of zero bits. The device may then "chain" the block 402 to the previous block 404 (which may have been "chained" to a previous block, not illustrated, in the same manner). When devices in the distributed network find the proof-of-work for a block, that block (e.g., block 402) is broadcast to the distributed network, and other devices in the distributed network will accept that block if all the transactions in it are valid and not already transferred (which may be determined by creating the next block using the hash of the accepted block 402). The distributed network will always consider the longest chain of blocks to be the correct one and will operate to continue to extend it. In a Proof of Stake (PoS) system, a validator that correctly proposed the next block and the proposal is attested by a majority of validators, then the next block would be accepted as the correct one. If a device receives two different versions of a block, it will work on the first block received, but save the second block received in case the branch of the chain that includes the second block becomes longer (at which point that device with switch to working on the branch of the chain that includes the second block).

As such, the transaction module 132 may facilitate exchanges and transactions associated with various reward tokens (e.g., reward tokens corresponding to different merchant, the universal tokens, etc.) by recording transaction data associated with the transaction on the blockchain 230 using the techniques described herein. For example, the user 140, via a user account with the service provider server 130, may request to exchange reward tokens corresponding to the merchant server 120 (e.g., a coffee shop) for reward tokens corresponding to the merchant server 180 (e.g., an airline). If the transaction module 132, via an account of the transaction system, possesses the reward tokens corresponding to the merchant server 180, the transaction system may perform the exchange directly with the user 140 (by recording a transaction that transfers reward tokens associated with the merchant server 120 from the account of the user 140 to the account of the transaction module 132, and a transaction that transfers equivalent reward tokens corresponding to the merchant server 180 from the account of the transaction module 132 to the account of the user 140). On the other hand, if the transaction module 132 does not possess the reward tokens corresponding to the merchant server 180 (or possesses insufficient reward tokens for the exchange), the transaction module 132 may identify one or more other users of the service provider server 130 who have the reward tokens corresponding to the merchant server 180 and desire to exchange for reward tokens corresponding to the merchant server 120.

In some embodiments, when the exchange is conducted between user accounts other than the account of the transaction module 132, the transaction system may first exchange, for the user account associated with the user 140, the reward tokens corresponding to the merchant server 120 for a corresponding amount of universal tokens, and exchange, for the counter-party in the exchange, the reward tokens corresponding to the merchant server 180 for the corresponding amount of universal tokens. The transaction module 132 may then reverse the transaction using the opposite reward tokens, such that the user account of the user 140 may obtain the reward tokens corresponding to the merchant server 180 using the universal tokens, and the counter-party may obtain the reward tokens corresponding to the merchant server 120 using the universal tokens.

In some embodiments, the users may, through the functionalities of the transaction module 132, convert their reward tokens corresponding to one or more merchants to the universal tokens, such that they can use the universal tokens to "buy" other reward tokens as they wish. In a sense, the universal tokens may act as an intermediary (e.g., a currency) for users to barter reward tokens with. In some embodiments, the users may hold the universal tokens until the time of transaction (e.g., a transaction that uses one or more reward tokens corresponding to a particular merchant). At the time of transaction, the transaction module 132 may perform the transaction for the user with the particular merchant by automatically converting the universal tokens to the reward tokens/reward data used by the merchant for the transaction.

In some embodiments, the transaction module 132 may establish exchange rates for exchanging between reward tokens corresponding to different merchants/reward systems. The exchange rates between reward tokens corresponding to two different merchants may be determined based on supply/demand for each of the reward tokens, the intrinsic values of the reward tokens (e.g., the value of the redeemable items associated with the reward tokens), and/or other metrics. By operating the token exchange framework using a blockchain, other third-party exchange platforms can perform exchanges of different reward tokens for the users as well by recording the exchange transactions on the blockchain of the token exchange framework.

Figure 5:
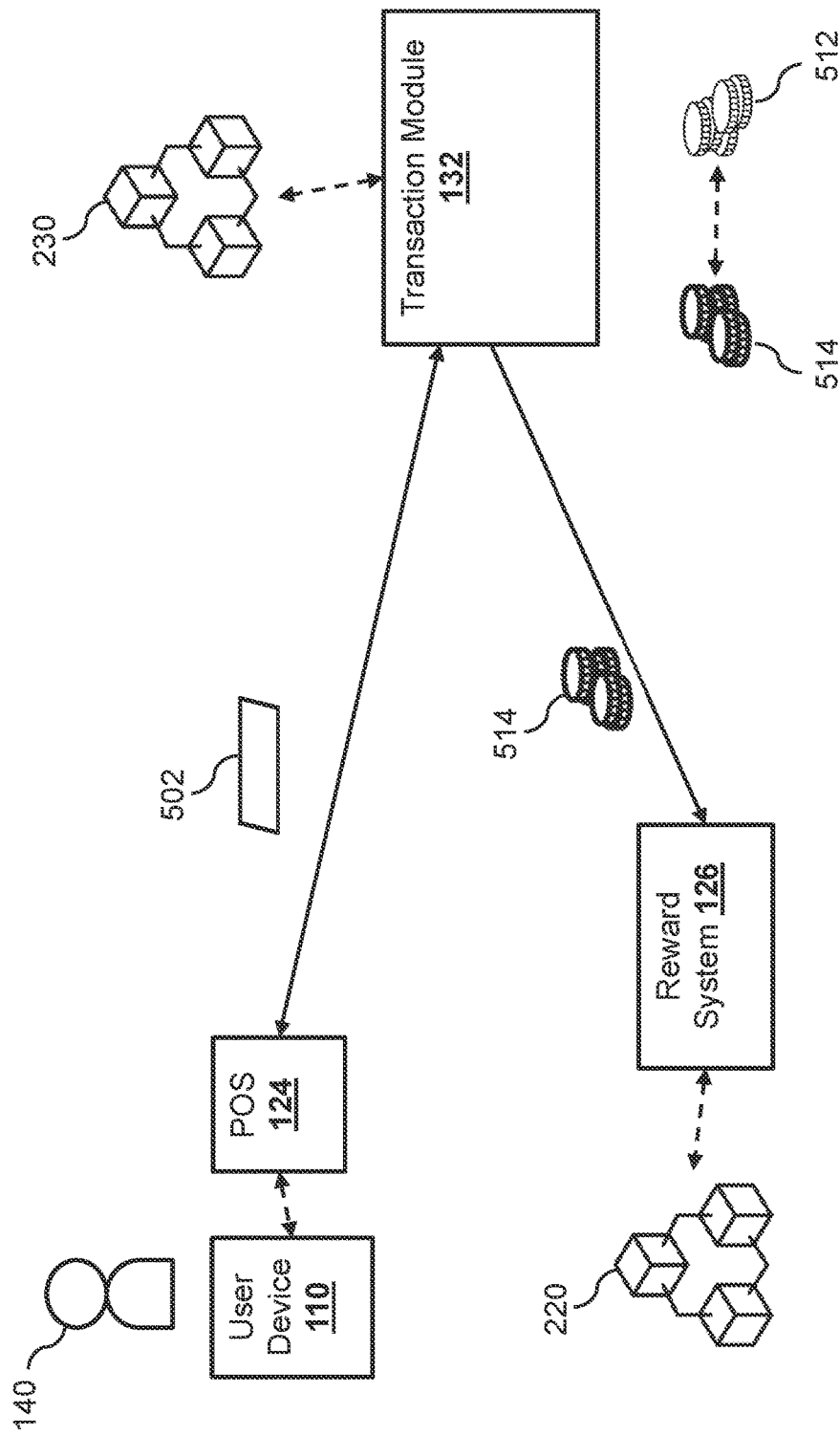
FIG. 5 illustrates facilitating transactions with different reward systems according to an embodiment of the present disclosure.

In addition to facilitating exchanges of reward tokens, the transaction module 132 may also facilitate redeeming rewards using the reward tokens associated with the users. FIG. 5 illustrates the process of redeeming rewards for a user via communication with various devices and systems. Specifically, the transaction module 132 may establish connections with POS systems associated with the different merchants (e.g., the POS system 124 of the merchant server 120), and communicate with the POS systems and the merchant servers (e.g., the merchant servers 120, 180, and 190) to facilitate the purchase transactions and redeeming of rewards with the merchants. Thus, as a user (or a merchant) initiates a transaction via the POS device 124, transaction data 502 of the transaction may be obtained by the transaction module 132 via the connection. In some embodiments, the transaction may include redeeming a reward (e.g., a free coffee, etc.) using reward data associated with the merchant. Based on the transaction data 502, the transaction module 132 may determine an identity of the user 140 (and a user account of the user 140), an identity of the merchant (e.g., the merchant server 120) associated with the transaction and an amount of reward tokens required to process the transaction.

The transaction module 132 may then access the user account to determine reward tokens in possession by the user account. For example, the transaction module 132 may traverse the blockchain 230 to determine whether the user account is in possession of any reward tokens corresponding to the merchant server 120, and whether the reward tokens corresponding to the merchant server 120 is sufficient for processing the transaction. If the user 140 is not in possession of any reward tokens corresponding to the merchant server 120 or the reward tokens possessed by the user is insufficient for the transaction, the transaction module 132 may determine whether the user 140 is in possession of reward tokens corresponding to other merchants. If the user 140 is in possession of reward tokens corresponding to other merchants (or universal tokens), the transaction module 132 may facilitate exchange of the tokens corresponding to the other merchants (or the universal tokens) for reward tokens corresponding to the merchant server 120 involved in the transaction, such that the reward tokens can be converted to the ones that can be used to redeem the reward in the transaction.

Once the transaction module 132 determines that the user 140, through the user account, has sufficient reward tokens corresponding to the merchant server 120 to for processing the transaction (e.g., based on the conversion), the transaction module 132 may use those reward tokens to process the transaction. Since different merchants may use different infrastructure for managing the rewards (e.g., some merchants may be completely opted-in to the token exchange framework, some merchants may use a blockchain, some merchants may use a computer-based data storage, etc.), the transaction module 132 may perform different processes for processing transactions (e.g., redeeming rewards, purchasing an item, etc.) with different merchants, depending on their native reward infrastructure.

In this example, the reward system 126 is implemented using a blockchain 220 that is incompatible with the blockchain 230. The transaction module 132 may access the wrapped reward tokens 512 of the user 140 that reside in the blockchain 230 and corresponding to the reward system 126. As discussed herein, each the wrapped reward tokens are associated (e.g., wrapped) with metadata that links to a corresponding token within the merchant's reward system 126. The wrap (e.g., metadata) associated with a wrapped reward token may also include an IOU smart contract for converting the wrapped reward token to a corresponding token within the blockchain 220 of the reward system 126. Thus, by executing the IOU smart contract of the wrapped reward tokens 512, the transaction module 132 may convert the wrapped reward tokens 512 to tokens 514 associated with the blockchain 220. The transaction system may then use the converted tokens 514 to process the transaction with the merchant (e.g., by recording a transaction on the merchant's blockchain 220). The transaction module 132 may also transmit a transaction complete notification to the POS device 124 such that the POS device can complete the transaction.

On the other hand, if the merchant's reward system involved in the transaction is implemented using a blockchain that is compatible with the blockchain 230, the transaction module 132 may simply transfer the reward tokens corresponding to the merchant from the blockchain 230 to the blockchain of the merchant, and record a transaction on the blockchain of the merchant for using the transferred reward tokens to redeem the item.

When the native reward infrastructure of the merchant is a computer-based data storage system (other than blockchains), the transaction module 132 may first convert the reward tokens to the corresponding reward data (e.g., a corresponding amount of points, a corresponding number of stamps, etc.) associated with the merchant's reward system. The reward data may be in control by an account of the transaction module 132 with the merchant's reward server. Thus, the transaction module 132 may, via the account, use the reward data to process the transaction (e.g., redeem the item) on behalf of the user to complete the transaction via communication with the respective POS device.

Figure 6:
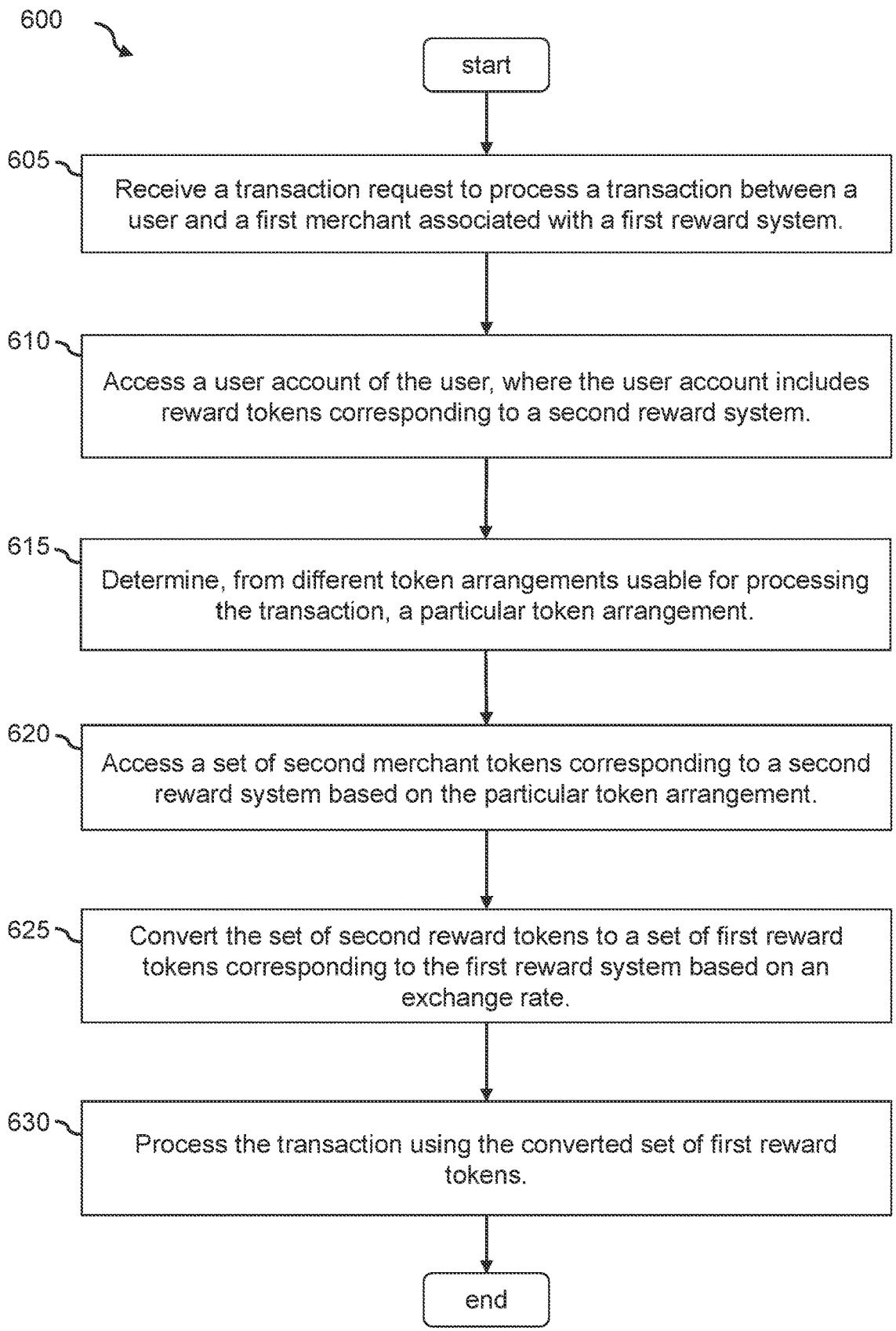
FIG. 6 is a flowchart showing a process of facilitating exchanges and transactions of reward tokens according to an embodiment of the present disclosure.

FIG. 6 illustrates a process 600 for facilitating exchanges and transactions associated with reward tokens according to various embodiments of the disclosure. In some embodiments, at least a portion of the process 600 may be performed by the transaction module 132 and the token management module 134 of the service provider server 130. The process 600 may begin by receiving (at step 605) a transaction request to process a transaction between a user and a first merchant associated with a first reward system. For example, the transaction module 132 may receive, via a POS device 124 of the merchant server 120, transaction data associated with a transaction between the user 140 and the merchant of the merchant server 120. The merchant may use the reward system 126 for tracking, managing, and performing transactions associated with reward data associated with the reward system 126.

The process 600 then accesses (at step 610) a user account of the user, wherein the user account includes reward tokens corresponding to a second reward system and determines (at step 615), from different token arrangements usable for processing the transaction, a particular token arrangement. For example, the transaction module 132 may traverse the blockchain 230 to access the reward tokens in possession by the user 140. The reward tokens may correspond to various merchants/reward systems, which may or may not include the reward system 126. In some embodiments, when the transaction module 132 determines that the user 140 does not have sufficient reward tokens corresponding to the reward system 126 for processing the transaction, the transaction module 132 may determine whether conversions from other reward tokens of the user 140, corresponding to other merchants, can be used to process the transaction. In some embodiments, the transaction module 132 may determine multiple token arrangements for processing the transaction, where each token arrangement specifies a set of reward tokens corresponding to one or more merchants, which can be used (after converting into reward tokens corresponding to the reward system 126) for processing the transaction.

The different token arrangements may specify different set of reward tokens. For example, one token arrangement may specify an amount of reward tokens corresponding to the reward system 186 for use in this transaction, another token arrangement may specify an amount of reward tokens corresponding to the reward system 196, yet another token arrangement may specify a first amount of reward tokens corresponding to the reward system 186 and a second among of reward tokens corresponding to the reward system 196. Furthermore, each token arrangement may or may not include reward tokens corresponding to the reward system 126 (the one that is associated with the transaction). In some embodiments, one of the token arrangements may include using cash to purchase at least a portion of the reward tokens required to process the transaction (especially when the user 140 does not have sufficient reward tokens required for processing the transaction).

In some embodiments, the transaction module 132 may present the different token arrangements on the user device 110, for the user 140 to select one of the token arrangements for use in the transaction. In some embodiments, the transaction module 132 may determine an optimal token arrangement for the transaction based on use patterns of the user 140 (e.g., which reward tokens are used less frequently by the user 140, etc.), exchange rates, and other factors. The transaction module 132 may highlight the optimal token arrangement (e.g., bolding the arrangement, use a different color for the optimal token arrangement, etc.) on the presentation on the user device 110.

Once the particular token arrangement has been determined, the process accesses (at step 620) a set of second merchant tokens corresponding to the second reward system based on the particular token arrangement and converts (at step 625) the set of second reward tokens to a set of first reward tokens corresponding to the first reward system based on an exchange rate. For example, the transaction module 132 may accesses reward tokens of the user 140 corresponding to the reward system 186 based on a selection of the token arrangement. The transaction module 132 may also exchange the reward tokens corresponding to the reward system 186 to reward tokens corresponding to the reward system 126 by recording a transaction on the blockchain 230. In some embodiments, if the reward system 126 is incompatible with the blockchain 230, the transaction module 132 may also convert the reward tokens to a reward data format compatible with the reward system 126 (e.g., converting the reward tokens to tokens compatible with the blockchain 220 of the reward system 126, converting the reward tokens to reward points, etc.).

The process 600 then processes (at step 630) the transaction using the converted set of first reward tokens. For example, the transaction module 132 may communicate with the reward system 126 to complete the transaction based on the converted reward tokens.

FIG. 7 is a block diagram of a computer system 700 suitable for implementing one or more embodiments of the present disclosure, including the service provider server 130, the merchant servers 120, 180, and 190, and the user device 110. In various implementations, the user device 110 may include a mobile cellular phone, personal computer (PC), laptop, wearable computing device, etc. adapted for wireless communication, and each of the service provider server 130 and the merchant servers 120, 180, and 190 may include a network computing device, such as a server. Thus, it should be appreciated that the devices/servers 110, 120, 130, 180, and 190 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device or a service provider server via a network 722, such as network 160 of FIG. 1. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the token exchange and transaction functionalities described herein according to the process 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
one or more hardware processors; and
a non-transitory memory storing instructions, that when executed by the one or more hardware processors, cause the one or more hardware processors to perform operations comprising:
accessing a digital wallet associated with a user, wherein the digital wallet comprises a set of first merchant tokens associated with a first merchant and a first reward system;
generating a set of substitution tokens for representing the set of first merchant tokens within an exchange framework different from the first reward system, wherein the exchange framework comprises an exchange framework blockchain, and wherein the set of substitution tokens are generated within the exchange framework blockchain;
wrapping the set of substitution tokens with metadata that links the set of substitution tokens associated with the exchange framework to the set of first merchant tokens associated with the first reward system;
transferring the set of substitution tokens to the digital wallet; and
processing a transaction between the user and a second merchant using the set of substitution tokens via a logical bridge between the exchange framework blockchain and a second merchant blockchain.

2. The system of claim 1, wherein the operations further comprise:
   transferring the set of first merchant tokens from the digital wallet to the system.

3. The system of claim 1, wherein the first reward system comprises a first reward system blockchain, and wherein the operations further comprise:
   determining that the first reward system blockchain is incompatible with the exchange framework, wherein the generating the set of substitution tokens for representing the set of first merchant tokens is in response to the determining that the first reward system blockchain is incompatible with the exchange framework.

4. The system of claim 1, wherein the first reward system comprises a centralized computer database system that is incompatible with the exchange framework.

5. The system of claim 1, wherein the operations further comprise:
   exchanging, for the user associated with the digital wallet, the set of substitution tokens with a set of second merchant tokens associated with a second reward system via the logical bridge, wherein the transaction is processed using the set of second merchant tokens.

6. The system of claim 1, wherein the operations further comprise:
   receiving, from a user device associated with the user, a transaction request for processing the transaction between the user and the second merchant through a service provider, wherein the transaction is processed based on the transaction request.

7. The system of claim 5, wherein the set of second reward tokens are compatible with the exchange framework blockchain.

8. The system of claim 1, wherein the processing the transaction comprises recording the transaction on the exchange framework blockchain.

9. The system of claim 1, wherein the operations further comprise:
   receiving a request for converting the set of substitution tokens of a second digital wallet;
   retrieving the set of first merchant tokens based on the metadata wrapped in the set of substitution tokens; and
   transferring the set of first merchant tokens to the second digital wallet.

10. The system of claim 9, wherein the request is associated with a second transaction between a second user and the first merchant associated with the first merchant tokens.

11. A method, comprising:
   accessing, by a computer system, a digital wallet associated with a user, wherein the digital wallet comprises a set of first merchant tokens associated with a first merchant and a first reward system;
   generating, by the computer system, a set of substitution tokens for representing the set of first merchant tokens within an exchange framework different from the first reward system, wherein the exchange framework comprises an exchange framework blockchain, and wherein the set of substitution tokens are generated within the exchange framework blockchain;
   wrapping, by the computer system, the set of substitution tokens with metadata that links the set of substitution tokens associated with the exchange framework to the set of first merchant tokens associated with the first reward system; and
   transferring, by the computer system, the set of substitute tokens to the digital wallet, wherein the set of substitution tokens is usable for processing a transaction between the user and a second merchant via a logical bridge between the exchange framework blockchain and a second merchant blockchain.

12. The method of claim 11, further comprising:
   transferring the set of first merchant tokens from the digital wallet to the computer system.

13. The method of claim 11, wherein the first reward system comprises a first reward system blockchain, and wherein the method further comprises:
   determining that the first reward system blockchain is incompatible with the exchange framework, wherein the generating the set of substitution tokens for representing the set of first merchant tokens is in response to the determining that the first reward system blockchain is incompatible with the exchange framework.

14. The method of claim 11, wherein the first reward system comprises a centralized computer database system that is incompatible with the exchange framework.

15. The method of claim 11, further comprising:
   exchanging, for the user associated with the digital wallet, the set of substitution tokens with a set of second merchant tokens associated with a second reward system via the logical bridge, wherein the transaction is processed using the set of second merchant tokens.

16. The method of claim 11, wherein the method further comprises:
   receiving, from a user device associated with the user, a transaction request for processing the transaction between the user and the second merchant through a service provider, wherein the transaction is processed based on the transaction request.

17. The method of claim 15, wherein the set of second reward tokens are compatible with the exchange framework blockchain.

18. The method of claim 11, further comprising recording the transaction associated with the set of second reward tokens on the exchange framework blockchain.

19. The method of claim 11, further comprising:
   receiving a request for utilizing the set of substitution tokens of a second digital wallet in a second transaction;
   retrieving the set of first merchant tokens based on the metadata wrapped in the set of substitution tokens; and
   transferring the set of first merchant tokens to the second digital wallet, wherein the transferring enables the second digital wallet to use the set of first merchant tokens in the second transaction.

20. The method of claim 19, further comprising
   processing the second transaction through the second digital wallet using the set of first merchant tokens, wherein the processing the second transaction comprises recording the second transaction associated with the set of first merchant tokens in a first merchant blockchain associated with the first reward system.

* * * * *

UNITED STATES PATENT AND TRADEMARK OFFICE
CERTIFICATE OF CORRECTION

| | | |
|---|---|---|
| PATENT NO. | : 12,223,499 B2 | Page 1 of 1 |
| APPLICATION NO. | : 18/335769 | |
| DATED | : February 11, 2025 | |
| INVENTOR(S) | : Daniel Kang, Thomas Chen and Jonathan Ko | |

It is certified that error appears in the above-identified patent and that said Letters Patent is hereby corrected as shown below:

In the Claims

Claim 10, Column 23, Lines 48-49, change "transaction between a second user and the first merchant associated with the first merchant tokens." to --transaction between a second user and the first merchant.--.

Signed and Sealed this
Sixteenth Day of September, 2025

Coke Morgan Stewart
*Acting Director of the United States Patent and Trademark Office*